Jan. 6, 1959     H. J. BUTLER     2,867,295
DISC BRAKE FOR VEHICLES
Filed Nov. 7, 1952     7 Sheets-Sheet 1

INVENTOR
Henry James Butler
by Benj. T. Rauber
his attorney

Jan. 6, 1959  H. J. BUTLER  2,867,295
DISC BRAKE FOR VEHICLES
Filed Nov. 7, 1952  7 Sheets-Sheet 3

INVENTOR
Henry James Butler
by Benj. T. Parker
his attorney

Jan. 6, 1959        H. J. BUTLER        2,867,295
DISC BRAKE FOR VEHICLES Filed Nov. 7, 1952        7 Sheets-Sheet 5

Fig.9

INVENTOR
Henry James Butler
by Benj. T. Pauba
his attorney

Fig.11

United States Patent Office 2,867,295
Patented Jan. 6, 1959

2,867,295

DISC BRAKE FOR VEHICLES

Henry James Butler, Sutton Coldfield, England, assignor to Dunlop Rubber Company Limited, London, England, a British company Application November 7, 1952, Serial No. 319,379

Claims priority, application Great Britain October 11, 1951

3 Claims. (Cl. 188—73)

This invention relates to disc brakes for vehicles and more particularly motor vehicles and the like.

Disc brakes for vehicles, e. g. aircraft, road vehicles and the like, are known and are generally mechanically more efficient than comparable drum brakes. Some disc brakes, however, particularly those proposed for motor-vehicles, suffer from a disadvantage in that they are heavy and expensive to produce.

The object of the present invention is to provide a disc brake for vehicles which not only is mechanically efficient but is also light in weight and cheap to produce and which has a number of other advantages which will be apparent on reading the description herein.

According to the present invention a disc brake for vehicles comprises a disc rotatable with a wheel, pivotally mounted pressure plates located on each side of the disc, pads of friction material secured to said pressure plates and adapted to frictionally engage a minor portion of the radially-extending sides of said disc, and a fluid-pressure operated mechanism for effecting said frictional engagement.

The pressure plates are axially-aligned and are preferably located with their major axes normal to a radius of the disc. They are preferably linked together at one end, adjacent the outer periphery of the disc, the braking pressure being applied to the other ends of said plates. The braking pressure may be applied by a fluid pressure operated piston and cylinder mechanism associated with one of the plates at the end thereof remote from the pivoting end. The cylinder thereof bears against its associated plate and an operating rod, extending axially adjacent the periphery of the disc, has one end secured to the piston and the other end to the other pressure plate. Pressurization of the cylinder thus forces the two pressure plates together to brake the wheel. The pressure plates are linked by a torque arm or the like to a non-rotatable part of the wheel assembly, means being provided to allow the pressure plates to accommodate themselves to lateral vibrations and also radial expansion of the disc. Automatic wear compensating means may be provided to compensate automatically for wear of pads and means may also be provided for forcing the plates apart, when the braking pressure has been removed, to effect a pre-determined clearance between the disc and the pads.

The piston and cylinder mechanism may alternatively be provided on one of the pressure plates intermediate its ends, the piston thereof abutting a lever arm which actuates an operating rod in the manner described to operate the brake. An advantage of this construction is that a mechanical advantage may be obtained thereby and also the brake may be operated manually, as by a hand brake lever.

The pressure pltes may be V-shaped, being pivotally secured at their extremities and having a fluid pressure operated mechanism associated with the apices thereof to force the plates together towards the disc.

In order that the invention may be more fully described, reference is made to the accompanying drawings, of which

In one embodiment of the present invention, illustrated in Figs. 1, 2, 3, 4 and 5, a disc brake for a motor-vehicle rear wheel comprises a disc 1 secured at its inner periphery to the end of a rotatable axle shaft (not illustrated). A non-rotatable axle casing (not illustrated) surrounds the shaft and a torque arm 2 mounted thereon adjacent one face of the disc extends radially outwardly beyond the periphery of the disc to support the pressure plates. The end of the torque arm beyond the periphery of the disc is provided with a part 3 extending past the periphery of the disc. A hole is provided axially through said part, at one end thereof, and a pin 4 is fitted in said hole, said pin projecting from both ends thereof and serving to anchor the ends of the pressure plates.

Two pressure plates 5 and 6 are provided, one on each side of the disc. The plates are axially in line with one another, their longitudinal axes being normal to a radius of the disc and being substantially bisected by said radius and said pressure plates project at each end beyond the outer periphery of the disc. The pressure plates are of rectangular channel section, the open sides thereof being presented away from the disc and the base thereof being provided with substantially segmental pads of friction material 7 each adapted to frictionally engage an adjacent radially extending face of the disc. The width of each pressure plate is of the order of two-thirds the radial width of the braking face of the disc.

A substantially triangular linkage plate 8 is secured at one edge to one end of each pressure plate, said linkage plates being axially in line. The apex of each plate remote from the pressure plate is provided with a hole extending therethrough to receive an end of the pin 4, said hole having concave sides. An annular bush 9 having complementary outer sides is rockably fitted in said hole, and the bushes are fitted over the projecting ends of the pin 4 extending from both ends of the hole in the part 3 of the torque plate so that the pressure plates are held in fixed axial position relative to the axis of rotation of the disc 1 but may swing to and from the disc.

Said part 3 of the torque plate is also provided with another hole extending axially therethrough, said hole being at the end of said part remote from pin 4, and another pin 10 is fitted in said hole, both ends projecting therefrom. The projecting ends of said pin 10 are each loosely fitted through a hole 11 in the linkage plates 8 and project therefrom, and one end of a substantially rectangular link 12 is rigidly secured to each of said projecting ends. The other end of said link is rigidly secured to a stud 13 extending through the linkage plate 8, the longitudinal axis of the link 12 being parallel to the axis of the associated pressure plate. This linkage holds the pressure plates from swinging about the axis of the pin 4 but permits limited swinging transverse to this axis. A connecting rod 14 extending axially adjacent the outer periphery of the disc has a reduced diameter portion at each end thereof which passes loosely through a hole in the base of each pressure plate, intermediate the walls thereof and at the end adjacent the linkage, said reduced diameter portions being retained in position by a pin 15 passing radially therethrough. These pins secure the pressure plates pivotally at fixed distances against axial thrusts of the pressure plates when the brakes are applied.

Figure 1:
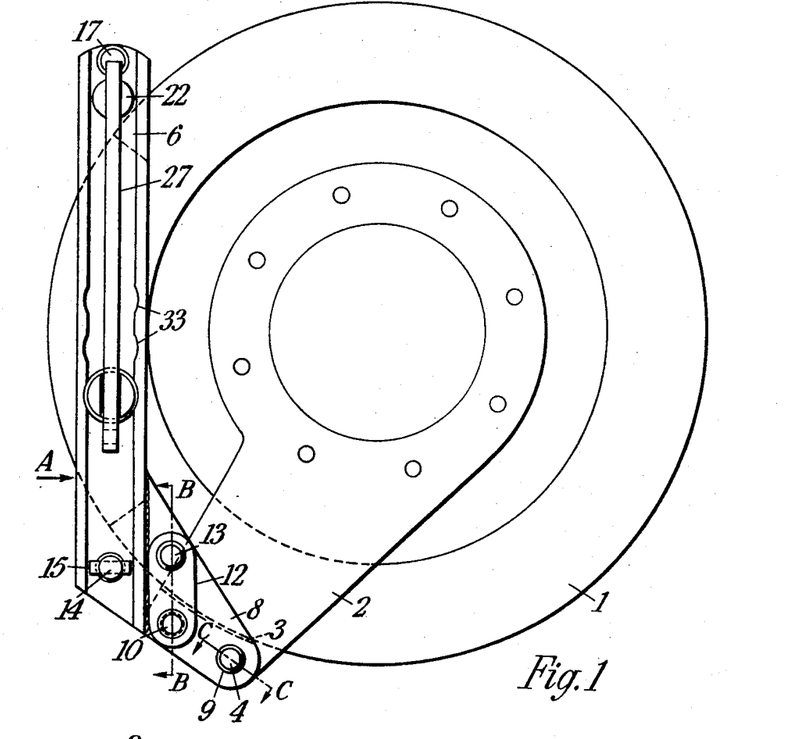
Figure 1 is a view of a brake disc and disc brake constructed in accordance with one embodiment of the invention.
Figures 2, 5:
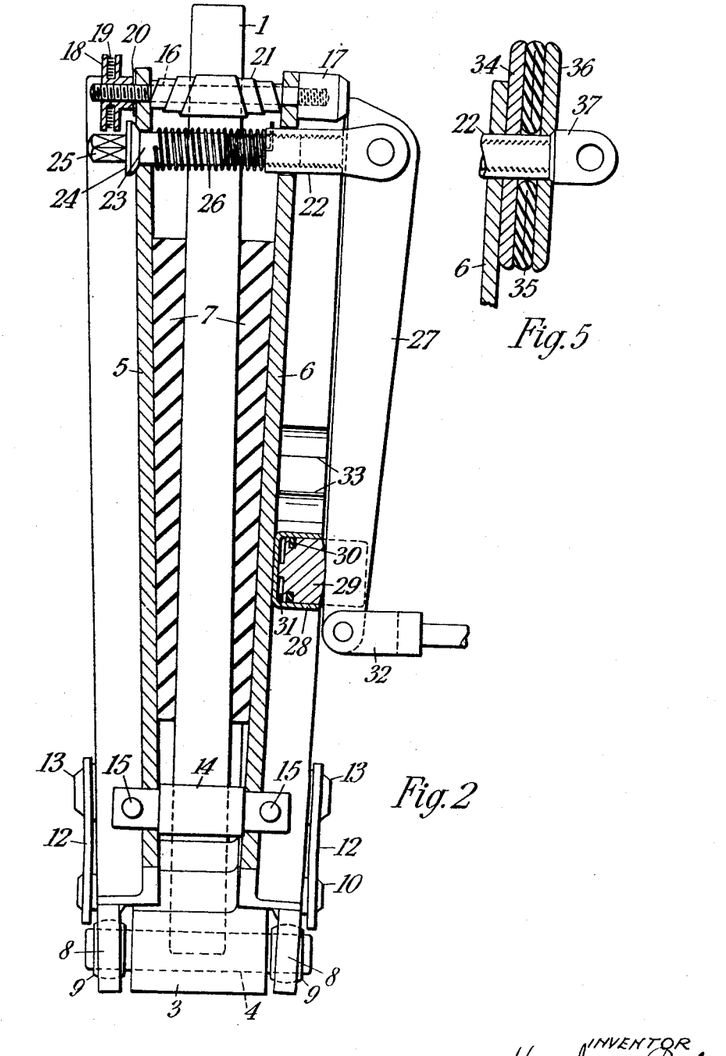
Figure 2 is a view of Figure 1 in the direction of arrow A.
Figure 5 shows alternative fluid-pressure operated means for actuating the brake.
Figure 3:
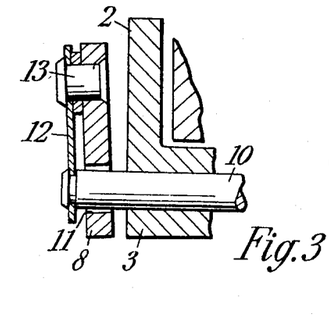
Figure 3 is a fragmentary section of Figure 1 taken on the line B—B and looking in the direction of the arrows.
Figure 4:
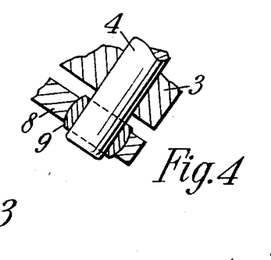
Figure 4 is a fragmentary section of Figure 1 taken on the line C—C and looking in the direction of the arrows.

The arrangement is such that the two pressure plates 5 and 6 can each pivot away from or towards the disc and can also accommodate themselves to vibrations and lateral displacement of the disc, caused for example, by road shocks, cornering, deflection of the wheel axle and the like.

A hole is provided through the ends of the pressure plates remote from the torque arm and a spindle 16 is loosely fitted therethrough. Both ends of the spindle are threaded and one end is screwed into a boss 17 secured within the channel of pressure plate 6. The other end of the spindle is screwed into a rotatable member 18 located in the channel of the other plate 5 and provided at its outer periphery with an annular groove. A clock-type spring 19 is fitted in said groove, one end thereof being secured to said member and the other end to said plate. A Belleville washer 20, of known rating, is fitted between the rotatable member and the base of the channel member. The clock-type spring is maintained in tension to keep the rotatable member seated on the washer. However, it is not strong enough to cause the said member to compress or flatten the Belleville washer. A volute spring 21 is fitted over the spindle and between the two pressure plates.

A cylindrical sleeve 22 is slidably fitted through a hole in the base of the pressure plate adjacent the boss 17, said sleeve lying on the longitudinal axis of said plate and being located adjacent the outer periphery of the disc and between the disc and said boss. One end of the sleeve, i. e. the end adjacent the disc, is internally threaded and screwed therein is one end of a pull-rod 23 which extends axially adjacent the outer periphery of the disc and passes through a hole in the base of the other pressure plate. Said hole is provided with a countersunk seating to accommodate a complementary shaped head 24 at the end of the pull rod and said head is also provided with a squared end 25, whereby the screwed pull rod may be rotated. A helically coiled spring 26 encircles said rod, one end thereof being secured to the rod and the other end to the adjacent end of the sleeve. The spring is tensioned to tend to rotate the pull rod relative to the sleeve in such a direction that the pull rod is screwed further into the sleeve on rotation.

The end of the sleeve remote from the pull rod is bifurcated and pivotally secured therein is a lever 27 which extends alongside the adjacent pressure plate towards the torque arm end. One end of the lever bears upon the centre of the boss. The other end of the lever is associated with a fluid-pressure mechanism located within the channel part of the pressure plate 6 intermediate its ends. This mechanism comprises a cylinder 28 force-fitted into an enlarged portion of the channel and a plunger 29 slidable therein. The plunger projects exterior of the cylinder, the projecting portion being provided with a transverse slot into which the adjacent end of the lever is fitted. The plunger is provided with a convention sealing ring 30 to prevent leakage of pressure fluid. A space 31 is provided between the plunger and the base of the cylinder, and this space is connected to a source of fluid pressure under the control of the driver of the vehicle. The extreme end of the lever is linked by means of a cable or similar linkage 32 (Figure 2) to a conventional hand-brake.

In a normal inoperative condition of the brake the two pressure plates are forced apart by the volute spring to give an effective clearance between the friction pads and the disc. The Belleville washer is pressed flat by the force of this spring. Further outward movement of the plates is prevented by the pull rod which has the head at one end and the sleeve secured to the lever at the other end, and also by the spindle having the rotatable member at one end and the boss at the other. The effective distance between the pivoting point of the lever and the centre of the plunger of the fluid pressure operated mechanism is approximately ten times the distance between the said pivoting point and the end of the lever associated with the boss, a 10:1 mechanical advantage thus being obtained.

The operation of the brake is as follows. On the driver of the vehicle applying his foot brake pedal to pressurise the master-cylinder and hence the system, the increase in pressure between the plunger and the base of the cylinder forces the plunger away from said base and this in turn angularly moves the lever about its pivoting point. The end of the lever bears on the boss and this forces the adjacent pressure plate angularly towards the disc, the friction material secured thereto frictionally engaging the adjacent braking face of the disc. Simultaneously the lever moves the sleeve secured thereto away from the adjacent pressure plate. The pull rod, secured to said sleeve and associated with the other pressure plate, pulls said pressure plate towards the disc, the friction material secured to said pressure plate also frictionally engaging the adjacent face of the disc. The total braking force is thus distributed evenly on both sides of the disc.

During the braking operation the volute spring holding the pressure plates apart, is, of course, compressed, and this allows the Belleville washer to return to its normal conical shape. If wear of the friction pads occurs during the braking operation a slight gap, equal to the wear of both pads, will appear between the base of the Belleville washer and the associated pressure plate, or between the apex of the Belleville washer and the rotatable member. The clock-type spring associated with the rotatable member will thus be enabled to rotate said member on the threaded spindle and take up this clearance until the rotatable member is resting lightly on the washer, without compressing the washer, and the washer is seated on the pressure plate. Thus wear of the pads is automatically compensated for, the distance between the plates at this end being shortened.

When the braking pressure is removed the volute spring forces the two pressure plates mutually apart up to the limit permitted by the rotatable member, compressing or flattening the Belleville washer in the process. Thus the linear deflection of the washer is the amount that the pads will separate from the disc. For example, if the deflection of the washer is 0.010 inch, then the distance between each of the pads and the disc, when braking pressure is removed, will be 0.005 inch. The actual amount of separation is thus dependent upon the deflection of the Belleville washer.

The tension in the pull rod is removed when the braking pressure is removed if wear of the pads has occurred and been automatically compensated for by the rotatable member. Thus the flange at the end of the pull rod will be spaced a short distance from the seating in the base of the pressure plate, this distance also being equal to the amount of wear that has taken place. The helical pre-tensioned spring encircling the pull rod will then be able to take charge, rotating the rod to screw it further into the sleeve, until the flange is once more engaged in the seating. The brake will thus be ready for further operation.

A further feature of the present invention lies in the provision of alternative accommodation for the brake applying means. The pressure plate 6 associated with the lever mechanism is provided, along the length of its channel section, with a plurality of enlarged portions 33 for the location of the brake-applying means. By placing the piston and cylinder mechanism in an alternative enlarged portion the mechanical advantage is altered and thus the braking load of the rear brake can be altered with respect to that of the front brakes.

The brake can, of course, be applied purely mechanically by tensioning the cable leading from the end of the lever by means of, e. g. a conventional handbrake lever which will also be in constant adjustment. Alternatively both methods of brake operation may be applied together.

It is not customary to provide a hand-brake attachment for the front brake and consequently the lever and piston and cylinder mechanism may be dispensed with and the sleeve associated with the pull rod have slidably fitted thereon an annular plate 34 (Figure 5) against which is fitted an annular inflatable and distensible sac 35. Another annular plate 36 on the other side of said sac and slidable on the sleeve 22 abuts an outwardly extending flange 37 at the end thereof. The sac is provided with a conduit communicating with a source of fluid pressure. When the sac is pressurised it distends forcing the annular plates in opposite directions, i. e. forcing both pressure plates inwardly towards the disc. The functioning of the remainder of the brake is as described above. The braking load may be varied by varying the size of the pressure sac.

Bellows or flexible diaphragms may be used in place of either the sac or piston and cylinder, and the piston and cylinder and sac may also be exchanged in either construction.

The Belleville washer may be replaced by any convenient resilient means, for example, a helically-wound spring.

Figures 6, 8:
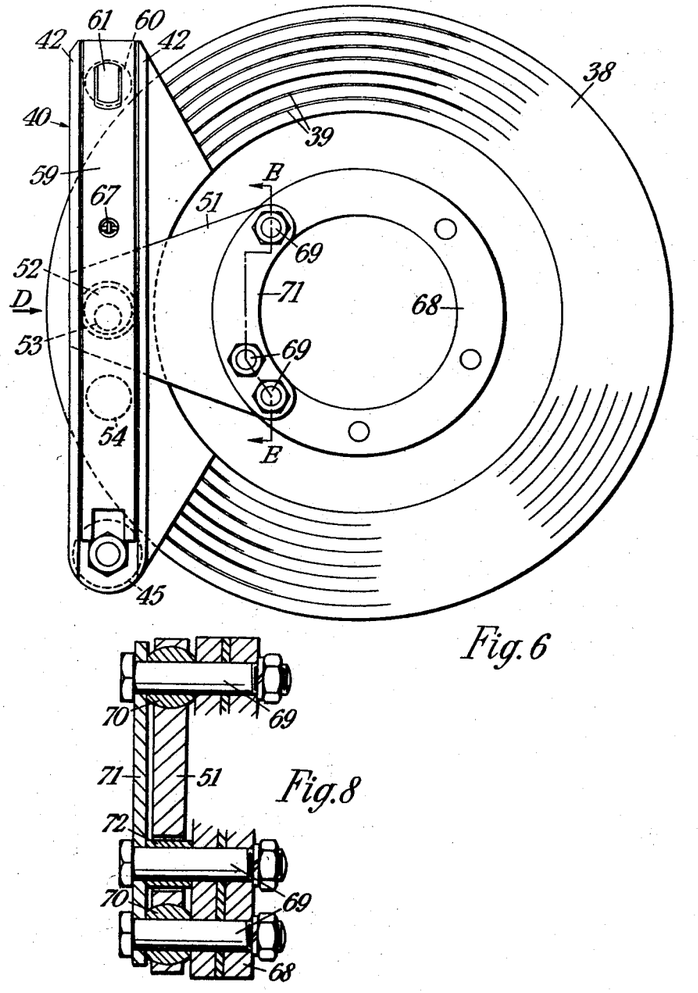
Figure 6 is a view of a brake disc and disc brake constructed in accordance with another embodiment of the invention.
Figure 8 is a fragmentary view through E—E of Figure 6, looking in the direction of the arrows.
Figure 7:
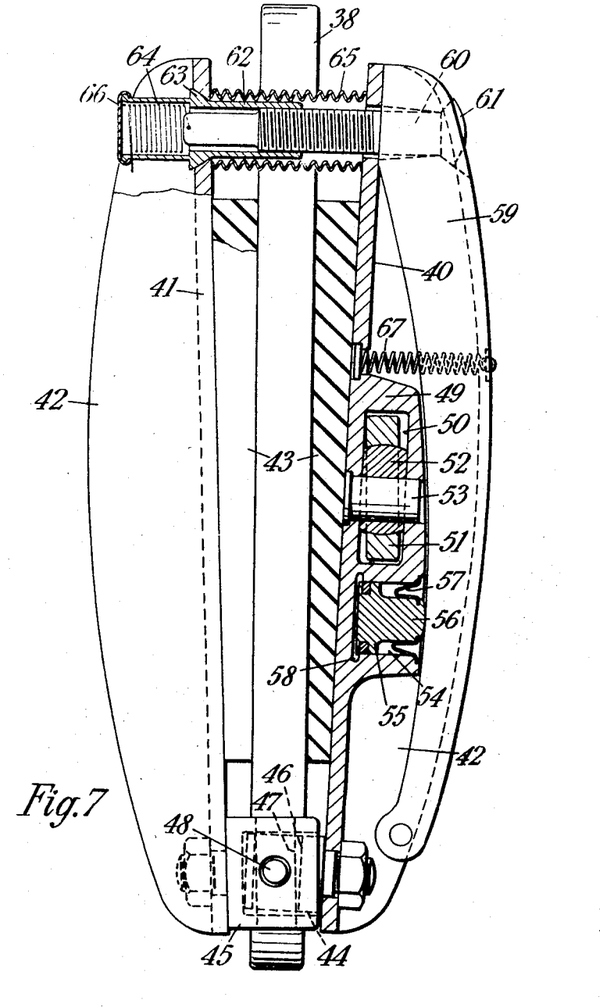
Figure 7 is a view of Figure 6 in the direction of arrow D.

In another embodiment of the present invention shown in Figures 6, 7 and 8 of the accompanying drawings, the disc 38 is provided on its radially-extending faces with a plurality of concentric equispaced grooves 39 of triangular section. Two pressure plates 40 and 41 are axially aligned one on each side of said disc, said plates being substantially segmental in shape, and extending over approximately one quarter of the braking area of the disc. Each plate is provided, on the face remote from the disc, with a pair of parallel stiffening ribs 42 extending longitudinally of said plate, i. e. normal to a radius of said disc, and said ribs are curved, having the greatest depth at the centre.

A part annular pad of friction material 43 is secured to each of the plates on the side adjacent the disc, the face of each pad adjacent the disc being provided with concentric, triangular projections complementary to the grooves on the face of the disc. The projections on the pad mate with the grooves on the disc and positively locate the pads with respect to the disc, thus preventing the pressure plate from wandering.

One end of one pressure plate 40 has bolted thereto a boss 44 which extends axially inwardly adjacent the outer periphery of the disc. The other pressure plate 42 is provided, at the same end, with a cup-shaped member 45 into which the boss loosely fits. A hole 46 having an axis parallel with the pressure plates is provided through the boss and a pin 47 having its ends secured to the cup-shaped member, is loosely fitted therein. Another pin 48, at right angles to pin 47, is similarly provided to allow one pressure plate to pivot freely relative to the other up to the limits imposed by the fitting of the boss 44 in the cup-shaped member 45.

The pressure plate 40 is provided, between the ribs thereof, and at a location intermediate its ends, with a thickened portion 49 extending away from the disc. Said thickened portion and ribs are provided with a slot 50 extending parallel with the plane of the disc, said slot accommodating one end of a torque arm 51 the other end of which is pivotably secured to a non-rotatable part of the wheel assembly. The end of the torque arm within the slot is provided with a hole having concave sides and a bush 52 having complementary shaped sides is rockably fitted therein. The bush is provided with an eccentric hole therethrough and a pin 53 is fitted through said hole, the ends thereof being secured at each side of the slot.

The said thickened portion is also provided with a cylinder 54 the open end thereof being presented away from the disc. A piston 55 is fluid tightly slidable therein having a plunger 56 projecting exterior of the cylinder. A flexible dust cap 57 prevents the entry of dust and foreign matter. An annular space 58 at the base of the cylinder is adapted to be connected to a source of fluid pressure, e. g. a foot-pedal operated master-cylinder.

A curved lever arm 59 is fitted snugly between the ribs of pressure plate 40, said arm passing over the thickened portion 49 and abutting the plunger 56 of the piston and cylinder mechanism. The end of the lever arm abuts the end of the pressure plate 40 remote from its pivoting end, and adjacent said end of the lever arm a hole is provided through which passes a spindle 60 having a head 61 fitting in a recess in said arm. The spindle passes axially through a hole in the pressure plate and adjacent the outer periphery of the disc, and is screwed inside a sleeve 62 which extends through a similar hole in the other pressure plate 41, said sleeve being provided with an outwardly extending flange 63 seating in a recess in the base of said plate 41. A pre-tensioned helically-wound spring 64 is fitted in a part of said sleeve, one end of the spring being screwed to said sleeve and the other end to the adjacent end of the spindle 60. A corrugated rubber cover 65 is fitted over the sleeve and spindle between the two pressure plates and the end of the sleeve remote from the spindle is provided with a dust-cap 66. A helically-wound spring 67 is fitted in tension between the plate 40 and the lever arm 59.

The non-rotatable part of the wheel assembly, to which the torque arm is pivotally attached, comprises an annular flange 68 having three studs 69 extending axially therethrough. The adjacent end of the torque arm is provided with three holes to register with said studs, the two outermost holes being provided with concave sides and a convex-sided bush 70 is fitted in each of said holes, the studs fitting through said bushes and projecting on the other side thereof. A substantially cresent-shaped plate 71 is securely fitted to the ends of all three studs, the intermediate stud being provided with a cylindrical bush 72 which is a loose fit in the asssocitaed hole in the torque arm. The effect of this arrangement is to enable the torque arm to pivot slightly about the flange 68 to allow for wear of the pads, at the same time being strong enough to take the full torque when the brake is applied. The method of securing the other end of the torque arm to the pressure plate 40, i. e. the bush and pin, enables both pressure plates to accommodate themselves to lateral displacement or vibrations of the disc, while the eccentric hole in the bush permits the plates to move radially outwards to maintain them in register with the disc when the disc expands outwardly due to the heating effect of braking.

The operation of the brake is similar to that hereinabove described. An increase in pressure in the annular space at the base of the cylinder forces the piston outwardly, angularly moving the lever 59 to force pressure plate 40 towards the disc and, acting through the spindle and sleeve, simultaneously forcing the other pressure plate 41 towards the disc, thus braking the wheel. On the braking pressure being released the spring 67 returns the lever 59 to its inoperative position and if any wear has occurred in the pads the pre-tensioned spring 64 will rotate the spindle relative to the sleeve to automatically take up said wear.

Figure 9:
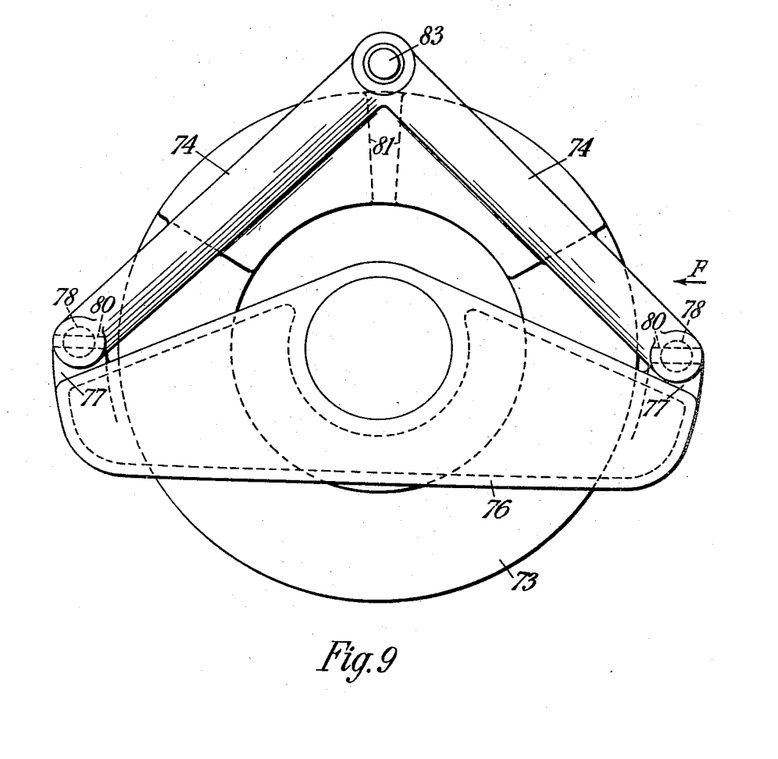
Figure 9 is a view of a brake disc and disc brake constructed in accordance with yet another embodiment of the invention.
Figure 10:
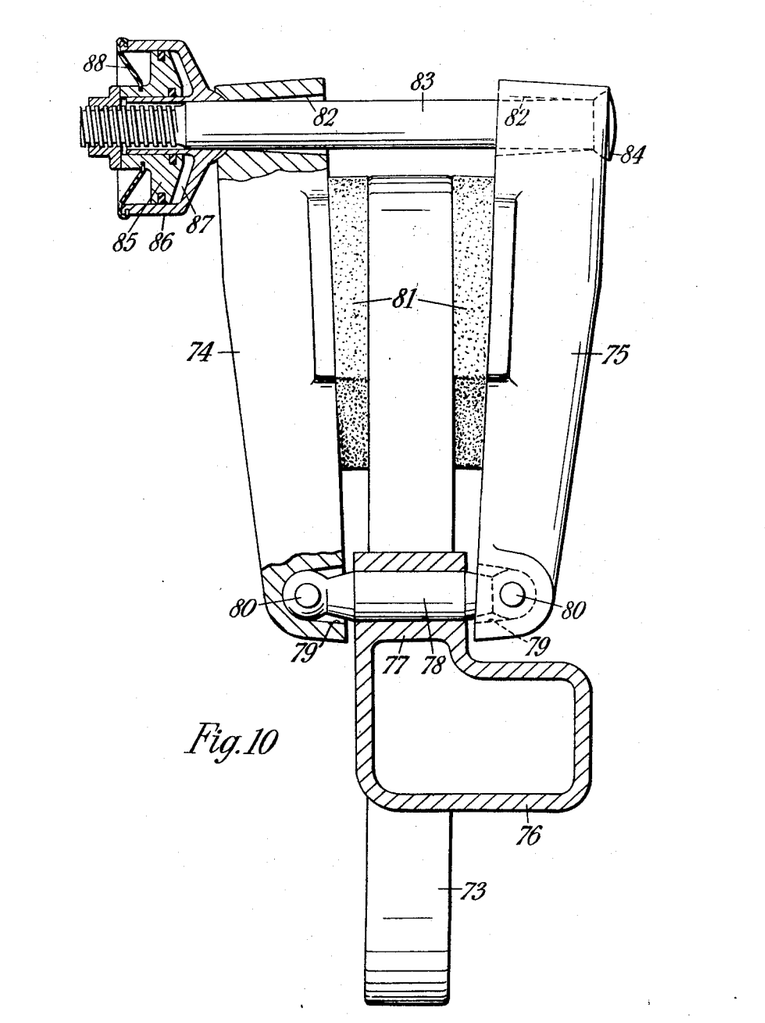
Figure 10 is a view of Figure 9 in the direction of the arrow F and Figure 11 is a side view of a brake disc and disc brake constructed in accordance with a further embodiment of the invention.

In yet another embodiment of the invention, illustrated in Figures 9 and 10 the rotatable disc 73 is provided on each side thereof with axially-aligned pressure plates 74 and 75 of substantially V-shape, the apex and extremities of said plates being located adjacent the outer periphery of said disc. A hollow torque plate 76 is non-rotatably secured to a part of the wheel assembly and extends substantially diametrically across the wheel. The two ends of said plate are each provided with a lug 77 radially in line with said disc and a pin 78 fitted axially through a hole in said lug and adjacent the periphery of the disc is provided with part-spherical ends.

The two extremities of each V-shaped pressure plate are each provided with a tapered hole 79 having a rounded base, the part-spherical ends of said pins being fitted into said holes and retained therein by pegs 80, each pair of pegs associated with a pressure plate being co-axial so that the plate is pivotable towards or away from the disc. Each pressure plate has secured thereto two arcuate pads of friction material 81 to frictionally contact the adjacent braking face of the disc. The pressure plates are shaped to suitably accommodate said plates.

The apices of the two pressure plates are axially aligned adjacent the outer periphery of the disc, and an axially-extending tapered hole 82 is provided through each of said apices. The smaller diameter ends of said holes are located on the sides of the plates remote from one another, and said ends are provided with part-spherical recesses. An operating rod 83 is fitted through said holes, extending adjacent the outer periphery of said disc, and one end thereof is provided with a head portion 84 seating in the recess in the plate 75. The other end of said rod is threaded, and screwed thereon is a nut which bears on an inner peripheral portion of an annular piston 85 which is fluid-tightly slidable in an annular cylinder 86. The base of the cylinder is provided with an annular part-spherical portion which seats in the recess in the pressure plate 74. An annular gap 87 between the piston and the base of the cylinder is adapted to be connected to a source of fluid pressure. An annular flexible cap 88 is fitted between the piston and cylinder to prevent the entry of dust and the like.

This embodiment of the invention operates in a manner similar to those hereinabove described. An increase in pressure between the annular piston and the base of the cylinder forces said piston and base mutually apart, thus forcing the two pressure plates together and the friction pads secured thereto into frictional engagement with the braking surfaces of the disc. Wear of the friction pads may be compensated for by rotating the nut at the end of the operating rod in the requisite direction and thus decreasing the distance between the pressure plates.

In an alternative construction the torque plate may be dispensed with and the extremities of the V-shaped pressure plates pivotally attached to an alternative non-rotatable part of the wheel structure.

An advantage of these constructions is that the fluid pressure operated piston and cylinder mechanism is substantially isolated from the disc and the parts of the brake which heat up during braking. Thus the pressure fluid and the rubber seals of the piston are not deleteriously affected by any increase in temperature of the brake.

Figure 11:
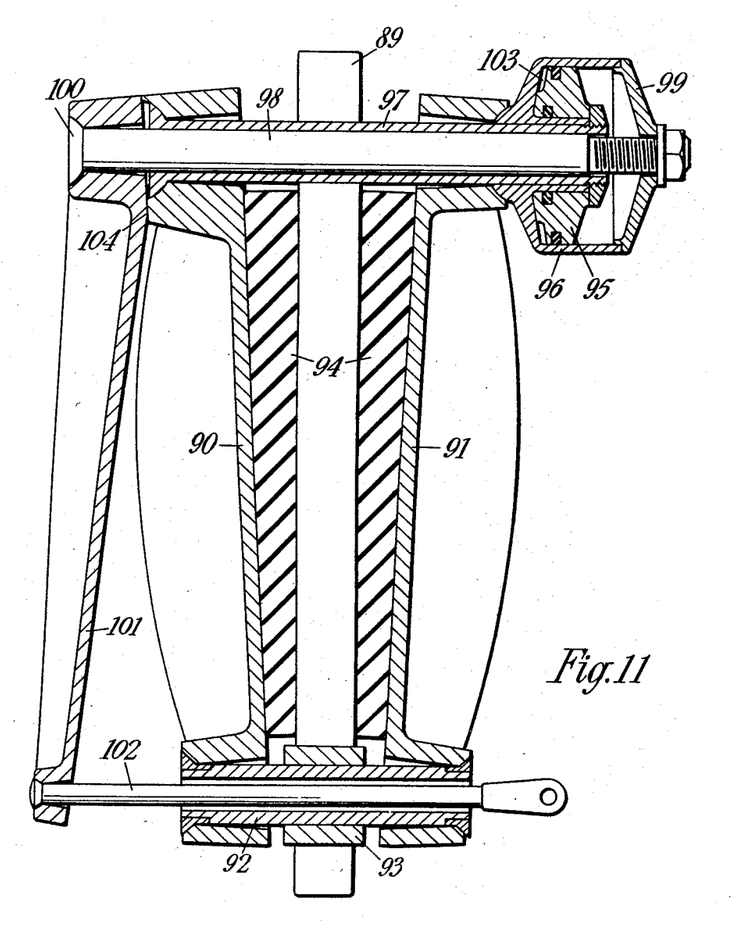

In a further embodiment of the present invention, illustrated in Figure 11 of the accompanying drawings, a disc 89 rotatable by a wheel is provided with two axially aligned pressure plates 90 and 91, one on each side of the disc, as in the first embodiment of the invention. Both pressure plates are pivotable at one end about a hollow sleeve 92 secured to the end of a torque arm 93 non-rotatably secured to the wheel assembly. Each pressure plate is provided with a pad of friction material 94 adapted to contact an adjacent face of the disc.

An annular piston 95 and cylinder 96 and associataed operating rod 97, similar to that described in the previous embodiment of the invention, are provided at the end of the pressure plates remote from the pivoting ends. In this embodiment of the invention, however, the operating rod 97 is hollow, and slidably fitted therein is a tension rod 98 having one end threaded, said threaded end being secured to a closure member 99 secured to the end of the cylinder. The other end of said stem is provided with a head 100 having a part-spherical under surface which seats in a complementary recess at one end of a hole extending through a lever arm 101 adjacent one end thereof, said arm extending adjacent said pressure plate 90. A cable or the like 102 is connected to the other end of said lever arm, said cable passing through the hollow sleeve 92 and being operatively connected to a hand-brake lever or the like. An annular gap 103 is provided between the annular piston and the base of the cylinder, said gap being adapted to be connected to a source of pressure fluid, e. g. a master-cylinder.

The arrangement is such that an increase in fluid pressure between the annular piston and the base of the cylinder forces said piston and base mutually apart to apply the brake in the manner hereinabove described. The brake may also be operated purely as a hand brake by tensioning the cable and angularly moving the associated end of the lever arm 101 towards the pressure plate 90. A projection 104 on the said arm between the cable and the stem, forces pressure plate 90 inwardly, whilst the end of the lever arm associated with the stem moves outwardly, and acting through the stem and cylinder forces the other pressure plate 91 inwardly, thus braking the associated wheel in the manner described.

Brakes constructed in accordance with the present invention are thus light and compact, economical to produce and easy to maintain and are efficient in operation. Having only one piston and cylinder or equivalent fluid pressure operated mechanism their fluid capacity is small and they can thus be operated by a conventional master-cylinder without the necessity for booster mechanisms or the like.

Having described my invention, what I claim is:

1. A disc brake for vehicles comprising a rotatable disc, a torque resisting support having portions lying on opposite sides of the axis of rotation of said disc and projecting beyond the periphery of said disc, a pin supported by each projecting portion with the longitudinal axis of each pin parallel to said axis of rotation, said pins extending beyond the faces of said disc, aligned pressure plates one on each side of said disc, said pressure plates being of V-shape, each extremity of each V-shaped plate overlying a pin end, and each extremity of each pressure plate having a recess mating with its respective pin, and pegs, one transverse each pin and recess, the pegs of each pressure plate having their longitudinal axes aligned and lying parallel to a diameter of said disc to permit said pressure plates to pivot on said pegs to swing to and from opposite sides of said disc, pads of frictional material secured to said pressure plates between said pressure plates and said disc to frictionally engage a minor portion of the radially-extending sides of said disc, and a fluid pressure operated mechanism engaging said pressure plates to swing said plates toward said disc to bring said friction pads into frictional contact with said disc.

2. The disc brake of claim 1 in which the vertices of said pressure plates extend beyond the periphery of said disc and are provided with axially extending holes enlarged toward the opposed faces of said pressure plates and having a recess of spherical curvature on the narrower outer ends of said holes and in which said fluid pressure operated mechanism comprises a rod extending through said holes having one end of said spherical curvature mounted in one of said recesses of spherical curvature and a piston and cylinder mechanism having the piston engaging said rod and in which the cylinder has a boss of spherical curvature mounted in the spherical recess of the adjacent pressure plate.

3. The disc brake of claim 2 in which said rod has a threaded engagement with said piston to enable said piston to be adjusted longitudinally of said rod.

References Cited in the file of this patent
UNITED STATES PATENTS

| | | |
|---|---|---|
| 1,980,616 | Engel | Nov. 13, 1934 |
| 2,127,557 | Ells | Aug. 23, 1938 |
| 2,228,818 | Eksergian | Jan. 14, 1941 |
| 2,266,059 | Milan | Dec. 16, 1941 |
| 2,371,158 | Eby | Mar. 13, 1945 |
| 2,586,518 | Collier | Feb. 19, 1952 |
| 2,663,384 | Chamberlain | Dec. 22, 1953 |
| 2,689,024 | Trevaskis | Sept. 14, 1954 |